US006994470B2

(12) United States Patent
Galomb

(10) Patent No.: US 6,994,470 B2
(45) Date of Patent: *Feb. 7, 2006

(54) AESTHETICALLY PLEASING SNAP CLOSURE FOR FLEXIBLE PACKAGES WITH MEANS FOR FACILITATING AUTOMATED APPLICATION TO FLEXIBLE PACKAGES, FLEXIBLE PACKAGES INCLUDING THE SAME, AND APPARATUS FOR APPLYING SNAP CLOSURES TO FLEXIBLE PACKAGES

(75) Inventor: David E. Galomb, Allentown, PA (US)

(73) Assignee: Fres-co System USA, Inc., Telford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/219,182

(22) Filed: Aug. 15, 2002

(65) Prior Publication Data

US 2004/0032995 A1    Feb. 19, 2004

(51) Int. Cl.
  *B65D 33/16*    (2006.01)
  *B65D 63/10*    (2006.01)
(52) U.S. Cl. .................... 383/63; 383/120; 24/30.5 R; 24/462
(58) Field of Classification Search .............. 24/586.1, 24/462, 585.11, 585.12, 30.5 R, 460; 383/63, 383/120, 65, 68, 210, 61.2, 905; 493/213
See application file for complete search history.

(56) References Cited

U.S. PATENT DOCUMENTS

| 651,937 | A | * | 6/1900 | Short ......................... 383/70 |
| 686,899 | A | * | 11/1901 | Heroux ....................... 383/91 |
| 3,141,221 | A | | 7/1964 | Faulis, Jr. |
| 3,346,883 | A | * | 10/1967 | Ersek ............................ 4/661 |
| 4,576,285 | A | | 3/1986 | Goglio |
| 4,705,174 | A | | 11/1987 | Goglio |
| 4,756,628 | A | | 7/1988 | Branson |
| 4,761,079 | A | * | 8/1988 | Wolske ....................... 383/62 |
| 4,807,300 | A | | 2/1989 | Ausnit et al. |
| 4,871,264 | A | * | 10/1989 | Robbins et al. ............... 383/68 |
| 4,898,280 | A | * | 2/1990 | Runge ....................... 383/200 |
| 4,913,561 | A | | 4/1990 | Beer |
| 4,988,216 | A | | 1/1991 | Lyman |
| 5,037,138 | A | | 8/1991 | McClintock et al. |
| 5,059,036 | A | | 10/1991 | Richison et al. |
| 5,147,272 | A | | 9/1992 | Richison et al. |

(Continued)

FOREIGN PATENT DOCUMENTS

GB    1008068    10/1965

(Continued)

OTHER PUBLICATIONS

European Search Report of Application No. EP 03 25 4990 dated Dec. 4, 2003.

*Primary Examiner*—Robin A. Hylton
(74) *Attorney, Agent, or Firm*—Caesar, Rivise, Bernstein, Cohen & Pokotilow, Ltd.

(57) ABSTRACT

A flexible package comprising an integral snap-closure and a method and apparatus for applying the snap closure to the package is disclosed. The snap closure is arranged to enable the repeated opening and closing of a mouth of the package and includes a segmented male closure element and a segmented female closure element that are arranged to snap-fit together. A pair of optional overlay strips may be provided to obscure the male and female closure elements to provide an enhanced aesthetically pleasing package.

41 Claims, 6 Drawing Sheets

U.S. PATENT DOCUMENTS

| | | | |
|---|---|---|---|
| 5,174,658 A * | 12/1992 | Cook et al. | 383/33 |
| 5,371,925 A * | 12/1994 | Sawatsky | 24/30.5 R |
| 5,622,431 A * | 4/1997 | Simonsen | 383/63 |
| 5,692,837 A | 12/1997 | Beer | |
| 6,050,484 A | 4/2000 | Galomb | |
| 6,082,897 A | 7/2000 | Galomb | |
| 6,132,089 A | 10/2000 | Galomb et al. | |
| 6,231,235 B1 * | 5/2001 | Galomb et al. | 383/63 |
| 6,234,676 B1 * | 5/2001 | Galomb et al. | 383/63 |
| 6,325,543 B1 * | 12/2001 | Ausnit | 383/210.1 |
| 2004/0208399 A1 * | 10/2004 | Linneweil | 383/68 |

FOREIGN PATENT DOCUMENTS

| | | |
|---|---|---|
| JP | 6127557 | 5/1994 |
| JP | 10-245045 | 3/1997 |

* cited by examiner

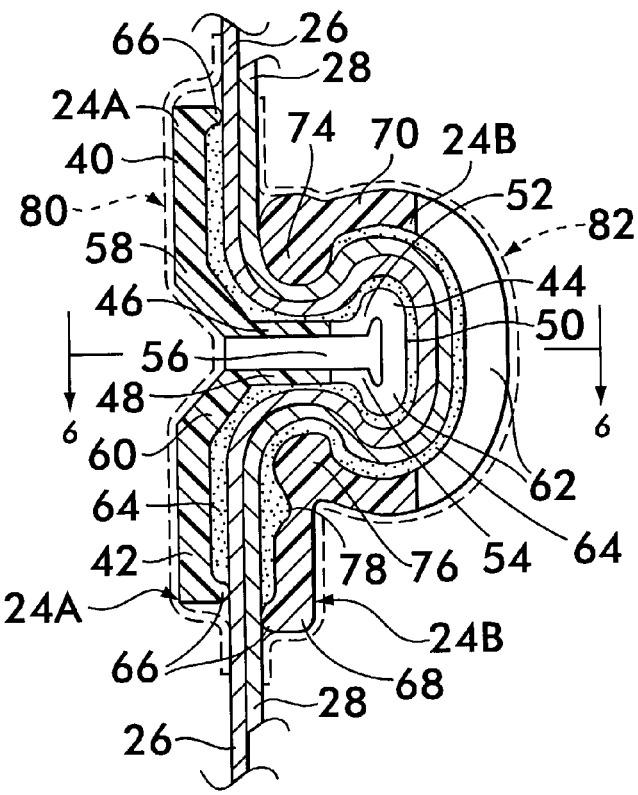
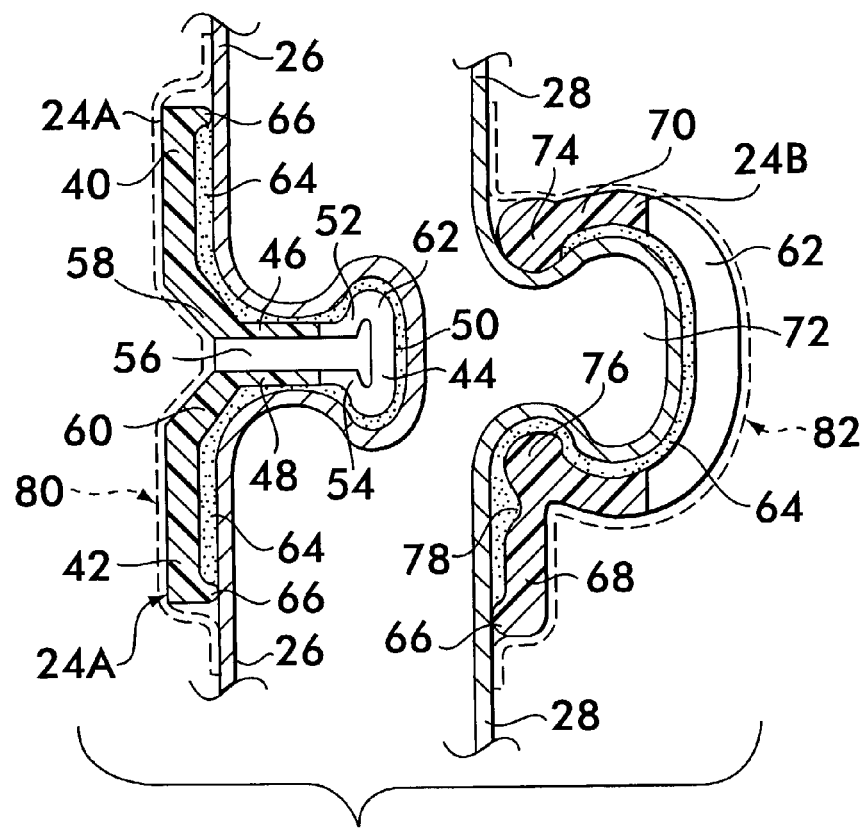

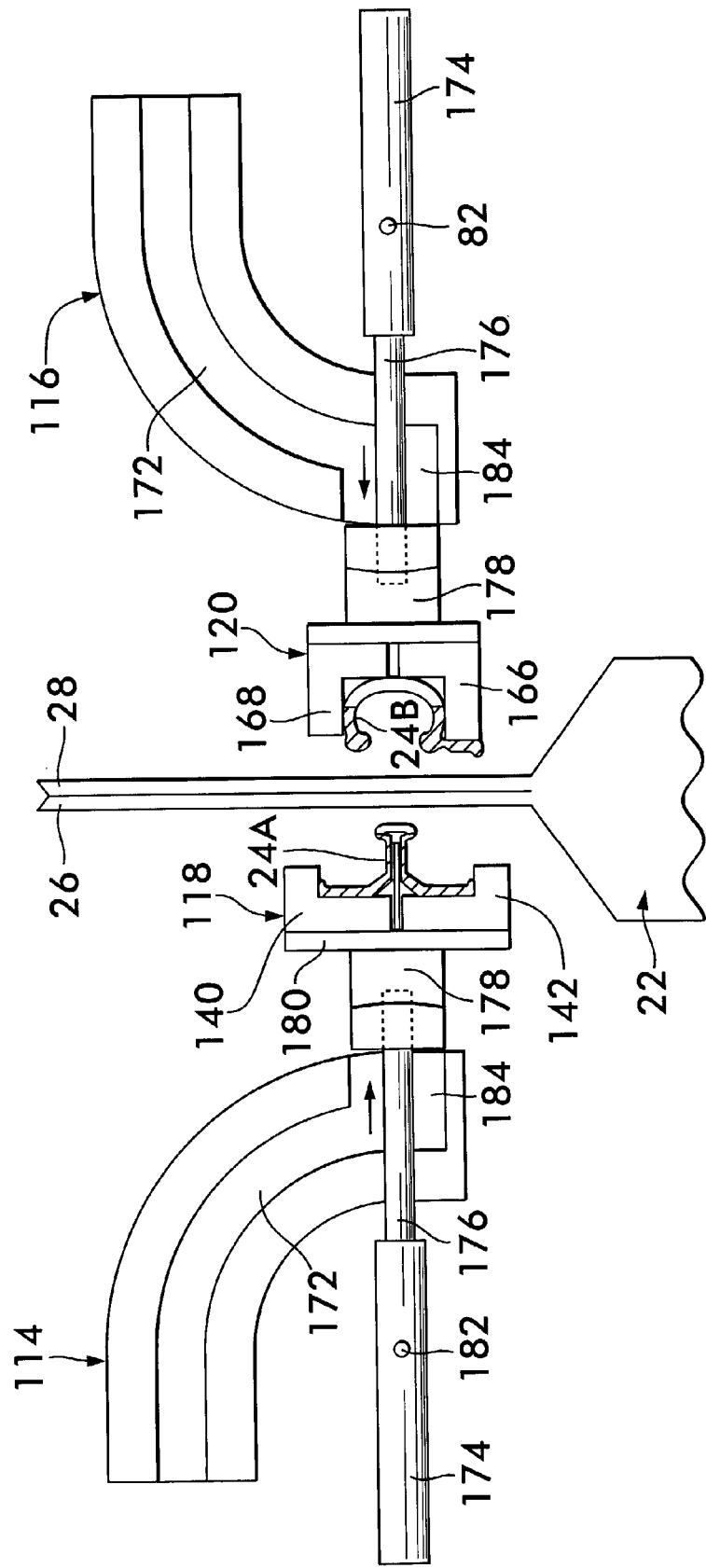

AESTHETICALLY PLEASING SNAP CLOSURE FOR FLEXIBLE PACKAGES WITH MEANS FOR FACILITATING AUTOMATED APPLICATION TO FLEXIBLE PACKAGES, FLEXIBLE PACKAGES INCLUDING THE SAME, AND APPARATUS FOR APPLYING SNAP CLOSURES TO FLEXIBLE PACKAGES

BACKGROUND OF THE INVENTION

1. Field of Invention

This invention relates generally to flexible packages, and more particularly to flexible packages for holding products, such as foods, under vacuum therein, and which once opened are arranged to be repeatedly re-opened and re-closed, while keeping the contents fresh.

2. Description of Related Art

Various types of flexible packages for holding particulate materials, e.g., ground or whole bean coffee, chemicals, etc., under vacuum therein have been disclosed in the patent literature and are commercially available today. Examples of such packages are found in the following U.S. Letters patent: U.S. Pat. No. 4,576,285 (Goglio), U.S. Pat. No. 4,705,174 (Goglio), and U.S. Pat. No. 4,913,561 (Beer).

One common type of flexible package for holding goods under vacuum until the package is opened is the so-called "gusseted" package or bag. Typically such a package is formed from a web of flexible stock material, e.g., polyethylene, polyester, polypropylene, metal foil, and combinations thereof in single or multiple plies, into a tubular body, having a face panel, a back panel, and a pair of gusseted sides. Each gusseted side is formed by a pair of gusset sections and a central fold edge interposed between a pair of outer fold edges. The lower end of the bag is commonly permanently sealed, e.g., heat sealed, along a line extending transversely across the width of the bag close to its bottom edge. The top of the bag is commonly sealed transversely across the entire width of the bag in a number of ways to maintain the contents under vacuum until the bag is opened. Such action is frequently accomplished via a readily openable mouth, which when opened provides access to the contents of the bag. For example, in one prior art package the top seal is made peelable by modifying the sealant layer with a peelable coating or incompatible additive. Thus, when the seal is peeled apart the unsealed portions form an open mouth through which the contents of the package may be removed. Another approach to providing an opening or mouth for a flexible package is that of the heretofore identified U.S. Pat. No. 4,705,174 (Goglio). That package includes a peel strip applied to the inner surface of the package below the top edges. The strip provides an air-tight interfacial seal which can be readily peeled apart to provide access to the interior of the package. Another approach to providing an opening or mouth for a flexible package is to score the upper flap of the package by laser or mechanical means through a tear initiation resistant layer(s) of the package structure. In this way the package can be opened by tearing away the scored area to form the package's mouth.

Gusseted bags, particularly those for foods, frequently make use of a plastic coated wire tie to serve as closure for the bag. In particular, the wire tie is designed to close the mouth of the bag after it has been initially opened so that the re-closed bag will keep its contents fresh. Whether or not such wire-tie closures effectively provide a positive means of re-closing a gusseted package is open to debate. Moreover, the effectiveness of such closures is frequently dependent upon the manner in which the wire tie is used. Thus, there is a perception in some quarters of the consuming public that a wire-tie package cannot be re-closed securely enough to maintain product freshness over an extended period of time. Therefore, such packages have not been fully accepted as being truly reclosable.

Non-gusseted flexible packages, such as stand-up pouches, are commercially available and typically include so-called "zipper-type" closures. Examples, of such packages are shown in U.S. Pat. Nos. 5,059,036 (Richison et al.), and 5,147,272 (Richison et al.). These zipper-type closures are generally perceived by the consuming public as providing for a more effective reclosure of the flexible pouch after it has been initially opened than twist or wire tie closures. In fact, zipper-type closures may be more effective than wire-tie closures. At the very least they are easier to use, and not prone to loss or misplacement. Thus, stand-up, flexible pouches with zipper-type closures have gained wide acceptance by the consumer.

While the stand-up, zipper-closure type pouch offers advantages over a gusseted flexible package insofar as actual or perceived reclosability is concerned, its shape does not allow efficient use of case packing and retail shelf space, as does a gusseted package. In addition, the stand-up pouch cannot be stacked readily, if at all.

In U.S. Pat. No. 5,692,837 (Beer), which is assigned to the same assignee as this invention and whose disclosure is incorporated by reference herein there is disclosed a gusseted flexible package having an integrated snap closure for re-closing and resealing the package after it has been initially opened. In particular, that package has an interior for initially holding some product, e.g., whole coffee bean or ground coffee, under vacuum, and which includes a mouth portion arranged to be peeled open to provide access to the contents of the package. The package is formed of a flexible material and includes a front panel, a rear panel, and a pair of opposed side gussets. The panels and gussets each include a top portion, which between them define the package's mouth. A peelable closure is provided within the mouth. A snap closure is provided above the peelable closure. The package is arranged to be sealed under vacuum, with the peelable closure maintaining the vacuum within the package until it is peeled open. The snap closure comprises a pair of snap strip members secured to respective portions of the front and rear panel. The snap strip portions are arranged to be releasably snap fit together with portions of the closure extending through opening in the side gussets, so that the snap strip portions can be opened and reclosed after the peelable closure has been peeled open in order to provide repeated access to the interior of the package, while minimizing the ingress of air into the package when it is closed.

Other references involving closures for packages are found in U.S. Letters patent Nos.: U.S. Pat. No. 4,988,216 (Lyman), and U.S. Pat. No. 5,037,138 (McClintock et al.), and in Japanese Application 6127557 (5/1994), and United Kingdom Patent 1,008,068 (10/1965)

In U.S. Letters Pat. No. 6,082,897 (Galomb) and U.S. Pat. No. 6,132,089 (Galomb et al.), there are disclosed snap closures for a flexible, gusseted package and a flexible gusseted package including the closures. The package includes a mouth portion arranged to be opened to provide access to the contents of the package. The package is formed of a flexible material and includes a front panel, a rear panel, and a pair of opposed side gussets. The panels and gussets each include a top portion, which between them define the package's mouth. The package's mouth is initially sealed but arranged to be opened, e.g., peeled apart. The snap closure enables the resealing of the mouth of the package and is made up of a pair of elongated elements, one of which includes a tongue extending along the length of it. The other element includes an undercut groove extending along the length of it. The elements are arranged to be pressed together, whereupon the tongue of the one element enters the groove of the other element with portions of the panels and side gussets tightly interposed therebetween. The closure elements may be longitudinally rigid or may be segmented to flex in the longitudinal direction to facilitate opening. Moreover, the closure elements may be a part of the package or separate components for use therewith. When the closure is part of the package the closure elements may be secured to the panels via an adhesive covering their entire inner surface. In any case when the closure is utilized it recloses the mouth of the package to preclude or minimize the ingress of air into the package.

While the inventions of the aforementioned prior art are suitable for their intended purposes, a need still exists for snap closures for use on gusseted packages and for gusseted packages which include snap closures which are easy to use, effective and which provide an aesthetically pleasing appearance.

All references cited herein are incorporated herein by reference in their entireties.

BRIEF SUMMARY OF THE INVENTION

A flexible package having an interior for holding material therein. The package is formed of a flexible material and comprises an integral snap-closure and first and second panels. The panels are connected to each other and each of the panels has an upper end portion, an inner surface and outer surface which conjoin to form a mouth for the package between the inner surfaces of the panels. The package's mouth is openable to provide access to the interior of the package. The snap closure is arranged for reclosing and sealing the mouth and comprises a male closure element and female closure element.

The male closure element is an elongated member comprising a pair of flanges, a pair of walls projecting upward from the flanges and defining a channel therebetween and a bulbous portion interconnecting the pair of walls. The bulbous portion has a plurality of transverse slits extending through it and partially into the walls at longitudinally spaced locations along the male closure element to enable the male member to bend more easily along its length. The male closure element has an outer surface and an inner surface. The inner surface of the male closure element is secured to the outer surface of one of the panels adjacent the mouth, and with portions of the panel extending about the bulbous portion.

The female closure element is an elongated member comprising a generally C-shaped portion having an elongated edge and a flange projecting along the edge. The female closure element has and outer surface, an inner surface and a plurality of slits extending partially through it at longitudinally spaced locations along it. The inner surface of the female closure element is secured to the outer surface of the other of the panels adjacent the mouth of the package. The bulbous portion of the male closure element is arranged to snap-fit into the C-shaped portion of the female closure element, with portions of the panels tightly interposed therebetween to close the mouth of the package to prevent the ingress of air into the package through the mouth.

BRIEF DESCRIPTION OF SEVERAL VIEWS OF THE DRAWINGS

The invention will be described in conjunction with the following drawings in which like reference numerals designate like elements and wherein:

FIG. 3 is an enlarged sectional view taken along line 3—3 of FIG. 1;

FIG. 4 is a view similar to FIG. 3, but showing the components of the closure secured to the panels of a package whose mouth has been opened before those closure components are brought into engagement with each other to re-close the mouth of the package;

FIG. 9 is a view similar to FIG. 8, but showing a later step in the process of applying and securing the closure components to the package.

DETAILED DESCRIPTION OF THE INVENTION

Figure 1:
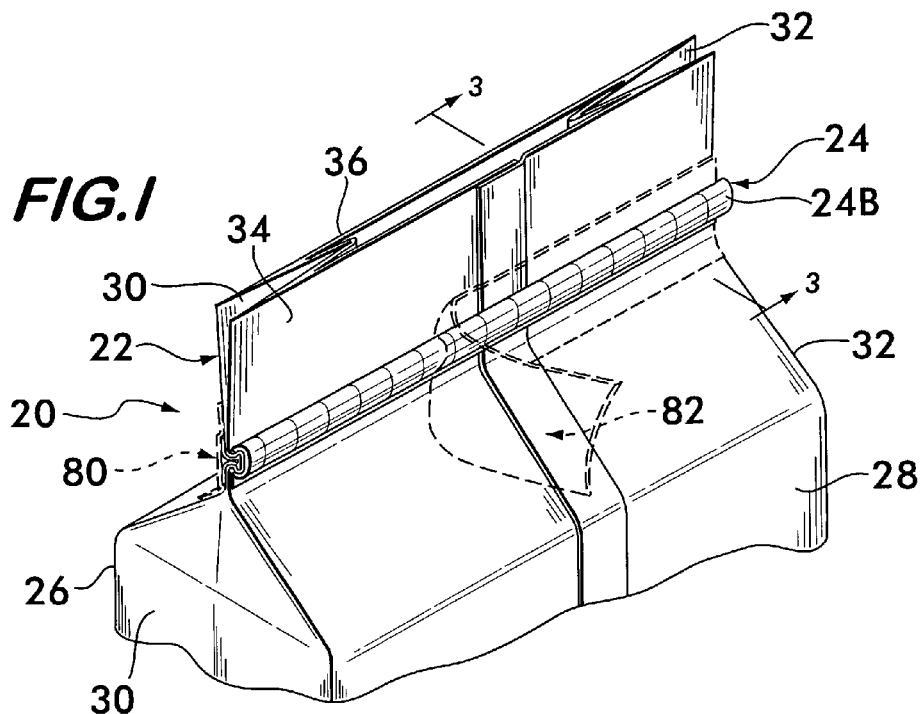
FIG. 1 is an isometric view of the upper portion of a package, e.g., a gusseted flexible package, including a snap-closure constructed in accordance with one aspect of the present invention shown sealing the mouth of the package and also showing via phantom lines an optional pair of overlay strips or covers for the closure that are constructed in accordance with another aspect of this invention.

Referring to FIG. 1, there is shown at 20 in FIG. 1 a flexible package constructed in accordance with this invention. The package 20 basically comprises a gusseted bag 22 and a re-sealable closure 24. The bag 20 is arranged to hold any material, e.g., coffee beans, ground coffee, chemicals, etc., for dispensing therefrom. The bag or package 22 is formed of a web of any suitable, flexible material in a manner to be described hereinafter.

Figure 2:
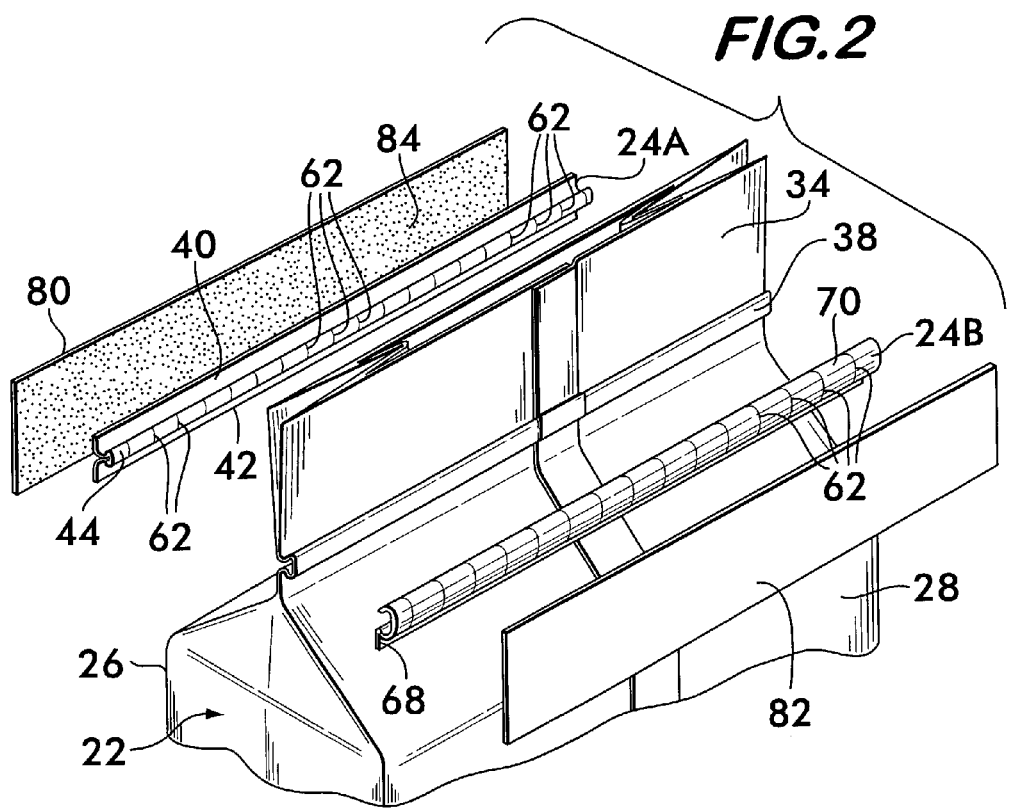
FIG. 2 is a view like that of FIG. 1, but showing the components of the closure and the optional covers exploded from the package.

Turning now to FIGS. 1–3 it can be seen that package 22 basically comprises a front wall or panel 26, a rear wall or panel 28, a pair of identical gusseted sides 30 and 32, a top end portion 34, and a bottom end portion (not shown). The top end portion 34 of the package terminates in a top marginal edge 36. In a similar manner the bottom end portion has a bottom marginal edge (not shown). If desired, a one-way venting valve (not shown) may be included in any suitable portion of the package to enable gases which may be produced by the material(s), e.g., coffee, contained within the sealed package to vent to the ambient air without air gaining ingress to the package's interior.

The front panel 26, rear panel 28, and the two gusseted sides 30 and 32 of the package are all integral portions of a single sheet or web of the flexible material, of single or multiple plies or layers, which has been folded and seamed to form a tubular body. One exemplary useful flexible material for the package 22 is a laminated web of flexible packaging material commercially available from Fres-co System USA, Inc., of Telford Pa., the assignee of this invention. That material comprises a 48 gauge polyester layer, ink, an adhesive layer, a 28 gauge aluminum foil layer, another adhesive layer, a 60 gauge nylon layer, another adhesive layer, and a 300 gauge easy open sealant layer. When a web of such material is formed into the tubular body for the package the polyester layer serves as the outer surface of the package, with the easy-open sealant layer being the inner surface of the package. Any other flexible packaging materials can be used in this invention.

As can be seen clearly in FIG. 1, the closure 24 is located in the top end portion 34 of the package. The details of the closure 24 will be described later. Suffice it for now to state that the closure 24 includes two elements or strips 24A and 24B (FIG. 2), each of which extends a desired distance across the width of the package's panels 24 and 26, with portions secured on the outer surface thereof in the top portion of the package below its top edge 36. As will be seen later the strip 24A is a male-like member while the strip 24B is a female-like member. The male-like member 24A is arranged to releasably snap-fit into the female member to effect the closing and opening of the package, as will be described later.

The package 20 is arranged to be initially hermetically sealed closed along a transverse seal line 38, after it has been filled and vacuumized. The seal line 38 is located at the situs where the closure strips will be secured and may be permanent or openable (e.g., peelable) and may be formed in any conventional manner. The seal line may be located at any location either above, below, or aligned with the closure 24 (as shown). In any case the package 20 can be readily opened by merely grasping portions of the package's panels at the top edges and pulling them apart to cause the peelable seal line to open, thereby forming a mouth for the package to provide access to the interior of the package. If the seal line is permanent it should be located above the closure 22 with some space between it and the closure 24 so that the package can be severed along a line between the seal line and the closure to thereby form the package's mouth. In either case, the seal line 38 extends across the width of the package 22 and seals the inner surfaces of the abutting front and rear panels to each other between the inner fold lines of the gussets 30 and 32, respectively, while sealing the outer marginal portions of the front panel 26 to the portions of the gusseted sides contiguous therewith, while also sealing the outer marginal portions of the rear panel 28 to the portions of the gusseted sides contiguous therewith, as is conventional. Thus, the seal line 38 serves to isolate the contents of the package from the ambient atmosphere once the package is sealed. If the seal line 38 is peelable, it may be formed by the appropriate heat sealing of the abutting easy-open sealant layer portions forming the inner surface of the package 22. Alternatively, the peelable seal line 38 can be formed in any other conventional manner, e.g., the use of peelable sealing strips like that disclosed in the aforementioned Goglio patents.

When the package 22 is filled, vacuumized, and sealed its contents, e.g., whole bean coffee (not shown), will be kept isolated from the ambient air by the seal line 38. The closure 22 is also preferably closed, i.e., its strips 24A and 24B being interconnected if the closure is located at the seal line. If desired, the top portion 34 of the package may be folded down to form a flap (not shown). The flap may, if desired, be held in place by a strip of adhesive tape (not shown) or some other adhesive means, so that the package is "brick-like" in shape to facilitate stacking or storage.

In order to gain ingress into the package so that some or all of its contents can be removed, if the package has a peelable seal line 38, the portions of the front and rear panels of the package contiguous with the top marginal edges 36 of the package are grasped and pulled apart. This action peels open the seal line 38, while also disconnecting or separating the two strips 24A and 24B (to be described later) making up the closure 24, to open the mouth of the package. The contents of the package can then be poured or otherwise removed through the package's mouth. If the package includes a non-openable seal line, e.g., a permanent heat seal, then the package can be severed below the heat seal line and above the closure 24. The newly formed top edge of the front and rear panels of the package which were formed by severing action can then be grasped and pulled apart to separate and disconnect the two strips 24A and 24B to open the mouth of the package.

The inclusion of the closure 24 as a part of the package (as in the embodiment of FIG. 1) enables the mouth of the package to be re-closed or resealed after some of the package's contents have been removed. Thus, the package and closure of the subject invention enable one to keep the remaining contents of the package fresh, i.e., generally isolated from the ambient atmosphere. It should be noted that the closure 24 can be a separate item not initially secured to the package. In particular a closure can be constructed similar to closure 24 and arranged to be secured to a conventional gussetted flexible package.

As mentioned above, the closure 24 comprises the pair of strips 24A and 24B which are arranged to releasably mate with each other. Each of the strips is an elongated member formed of a plastic material, e.g., high or low density polyethylene or polypropylene or some other material which is slightly flexible to enable it to be bent out of its original shape by the application of force thereto, but which returns to its original shape after removal of that force. Each strip is arranged to be fixedly secured, e.g., welded or permanently adhesively secured to the outer surface of the top portion of a respective one of the panels 26 and 28 of the package 22 and across the full width of the panel.

The construction of the strip 24A can best be seen in FIGS. 2–4 and basically consists of an elongated tongue-shaped member. In particular, the strip 24A includes an elongated planar upper flange section 40 (FIGS. 3 and 4), an elongated planar lower flange section 42 that is coplanar with the upper flange and an intermediate projecting bulbous or tongue section 44 and a pair of intermediate walls 46 and 48. The tongue section includes a generally planar top wall 50 and a pair of undercut sidewalls 52 and 54 which merge with the intermediate flanges 46 and 48, respectively. The intermediate walls 46 and 48 are each linear and planar and are spaced from each other to form a channel 56. The bulbous tongue section 44 is hollow and in communication with the channel 56. The flanges 40 and 42 each include angularly oriented portions 58 and 60 which merge with the intermediate walls 46 and 48, respectively, thereby forming a flared entryway to the channel 56. The hollow nature of the bulbous tongue section provides several advantages over the closure strips of my aforementioned U.S. patents: U.S. Pat. Nos. 6,082,897 and 6,132,089. First, it makes the wall thickness about the tongue section more consistent with the rest of the male closure strip, making it easier to control the dimensional tolerance of the profile of the supply material used to form the strip more consistent. This results in better and more consistently functioning parts. Second, it reduces the likelihood that a spline used in automated apparatus for applying the closure strip to a bag (such as that to be described later in this application), will meet unwanted resistance.

Figure 5:
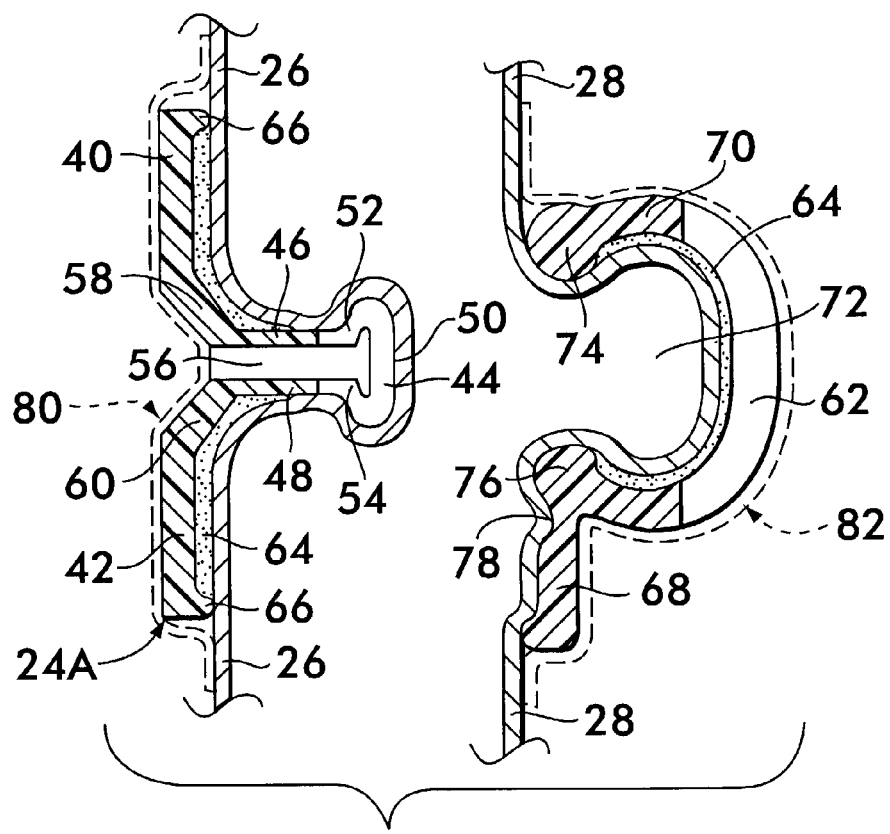
FIG. 5 is a view similar to FIG. 4, but showing a slightly different manner for securing the closure components onto the respective panels of the package.
Figure 6:
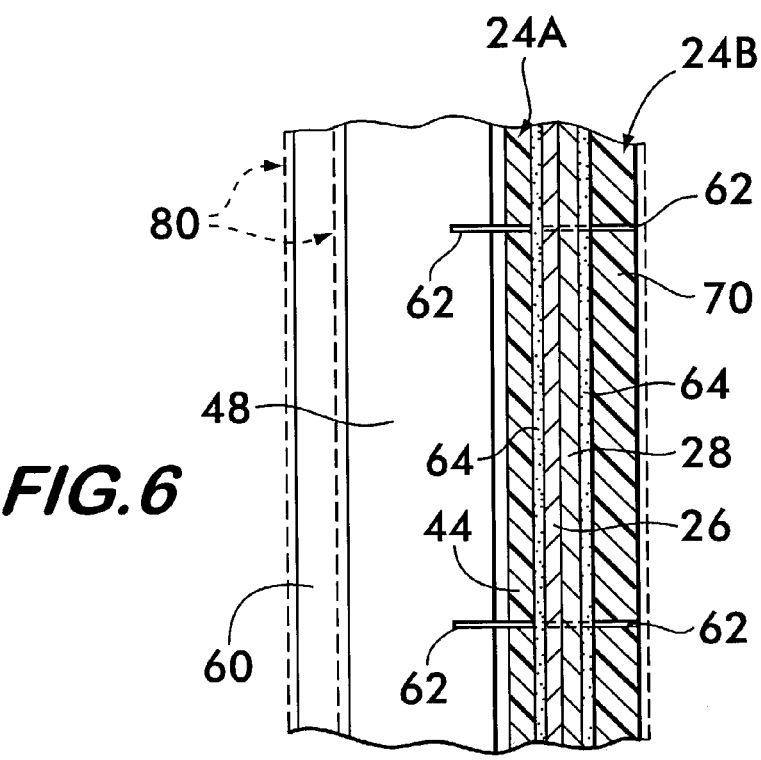
FIG. 6 is a sectional view taken along line 6—6 of FIG. 3.

As best seen in FIGS. 2–4 and 6 a plurality of equidistantly spaced, transverse slits 62 extend through the bulbous tongue 44 and partially into the intermediate walls 46 and 48, terminating well short of the flanges 40 and 42. The slits 62 serve to enable the strip 24A to bend or flex longitudinally, i.e., the section of the strip on either side of a slit 62 may flex with respect to each other to enable the strip 24A to be bowed, as will be described later. The flange 40 of the male strip 24A is fixedly secured to the outer surface of the front panel 26 via any suitable securement means e.g., a hot melt adhesive 64. In a similar manner the flange 42 of the female strip 24B is fixedly secured to the outer surface of the front panel 26. In order to ensure that the adhesive 64 does not run out or off of the flanges 40 and 42, thereby detracting from the appearance of the package, the inner surface at the free end of each flange includes an upwardly projecting nub 66. The nubs act as barrier walls to the egress of the hot melt adhesive 64. The adhesive may extend over the inner surfaces of the flanges 40 and 42, the intermediate sidewalls 46 and 48 and the bulbous tongue 44 thereby securing the front panel 26 to those portions of the strip 24A as shown in FIGS. 3 and 4. Alternatively, the adhesive 64 may only be located on the flanges 40 and 42 and partially on the intermediate sidewalls 46 and 48, as shown in FIG. 5. In either case the front panel is held in tight engagement with the inner surface of the strip 24A, although in the embodiment of FIG. 5, combined thickness of the tongue portion 44 and the panel 26 will be less than in the embodiment of FIG. 3 since there will be no adhesive at the interface of the tongue portion 44 and panel 26.

Other types of adhesives can be used to secure the male strip 24A to the panel 26 of the package. For example, an adhesive can be extruded onto the strip 24A during the fabrication of the strip. Such action can be accomplished by a co-extrusion process so that the adhesive surface is formed at the same time that the strip is formed. Alternatively, the strip can be formed and the adhesive then extruded on the strip. As should be appreciated by those skilled in the art, if the adhesive is extruded onto the strip the use of the nubs 66 may be obviated, since the adhesive will be less likely to spill out onto the portions of the package contiguous with the strip, than if a hot melt or other liquid adhesive is used. It should be pointed out that any type of adhesive can be used. In fact the strip 24A can be secured to the panel using non-adhesive securement techniques, e.g., thermal welding, ultrasonic welding, etc. While the nubs may be eliminated from the strips as a means of preventing spillage of adhesive off of the strips onto the panels of the package if the strips are provided with an adhesive pre-applied thereto, e.g., an extruded adhesive, the nubs may still be of some value to cooperate with feeding devices (to be described later) for carrying strips through automated application apparatus as will be described later.

The construction of the strip 24B will now be described. As can best be seen in FIGS. 2–5 the strip 24B is an elongated channel or recess-shaped member. In particular, the strip 24B includes an elongated planar lower flange section 68 and a generally C-shaped upper section 70 defining a groove or recess 72 therein (FIG. 4). The free edge 74 of the upper section 70 is in the form of a rounded bead. The lower flange section 68 merges with the C-shaped upper section in a bead 76. The upper end of the lower flange section is of a reduced thickness to form a hinge 78 enabling the C-shaped section to flex somewhat with respect to the flange 68.

The female strip 24B also includes plural equidistantly spaced transverse slits 62 therein. The slits 62 of the female member are preferably spaced from each other by the same spacing as the slits 62 of the male member 24A. The slits 62 of the female member extend partially into the C-shaped upper section 70. The slits 62 of the female member 24B serve the same general purpose as the slits 62 of the male member.

The female strip 24B is secured to the outer surface of the bag's rear panel 28 in a similar manner to the securement of the male strip 24A to the panel 26. To that end a hot melt adhesive 54 is applied to the entire inner surface of the strip 24 as shown in FIGS. 3 and 4. A nub 66 is located on the inner surface of the flange 68 at the free edge thereof to act as a stop to prevent leakage or spillage of the hot melt or other liquid adhesive onto the portions of the panel 28 contiguous with the strip 24B.

With the panel 28 secured to the inner surface of the strip 24B, the hollow interior or recess 72 of the C-shaped section 70 is arranged to releasably receive the tongue section 44 and the associated portion of panel 26 therein. In particular the tongue shaped section 44 and the panel portion covering it is enabled to snap fit within the recess 72 as shown clearly in FIG. 3. The size of the recess 72 in the C-shaped section 70 of the female member 24B is selected so that it is sufficiently large to accommodate the thickness of the panel 28 and the intermediate adhesive 54, yet enable the tongue section 44 with the adhesive 54 and the panel 26 to readily snap in to it to securely close the package's mouth, as shown in FIG. 3, yet enable the tongue section with the adhesive and the panel 26 to snap out of it to open the package's mouth, as shown in FIG. 4.

If desired the adhesive 54 of the strip 24B can be confined to only the area of the C-shaped section 70 between the beads 74 and 76 as shown in the embodiment of FIG. 5.

It must be pointed out at this juncture that the strips 24A and 24B can be mounted and secured to the rear panel 28 and front panel 26, respectively, instead of to the front panel 26 and rear panel 28, respectively, as in the embodiment shown in FIG. 1. Thus, the embodiment of package 22 shown herein is merely exemplary.

The material forming the strips is in and of itself somewhat elastic and/or flexible so that with the addition of the slits 62 the tongue portion 44 of the strip 24A can snap-fit into the groove or recess 72 of the strip 24B, and to be locked therein against accidental disconnection, yet which enable the tongue to exit that recess when the strips are pulled apart.

Once the package has been initially opened and a portion of its contents removed, the package can be readily resealed by use of the closure 24 to prevent or minimize the ingress of air into the interior of the package through its mouth. This action is accomplished by merely bringing the strips 24A and 22B into a confronting relationship, like shown in FIG. 4. Then the strips can be squeezed together to cause the tongue to snap into the groove carrying with it contiguous portions of the front panel 26 and side gussets 30 and 32. During this action portions of the front panel 26 and contiguous side gussets that are bent around the tongue to be carried into engagement with opposed portions of the rear panel 28 and contiguous side gussets 30 and 32 that are within the recess in strip 24B. Notwithstanding their flexibility, the strips 24A and 24B are substantially rigid so that when they are snapped together as just described, the confronting portions of the tongue and groove serve to sandwich the front panel 26, rear panel 28, and side-gussets 30 and 32 tightly therebetween, thereby producing a substantially air-tight seal.

The fact that each of the strips includes flanged portions and other portions projecting from the flanged portions tends to reinforce the strips and keep them linear to further ensure that the mouth of the package is sealed closed when the strips are snap connected to each other. Thus, when the strips 24A and 24B are snapped together the contents of the bag 22 are effectively isolated from the ambient surroundings so that it can be kept fresh over an extended period of time.

The package can be readily opened at any time by merely snapping apart (disconnecting) the two strips 24A and 24B. In order to accomplish that action and since the strips are somewhat flexible and resilient, the user of the package can readily grasp any portion of the front panel of the package contiguous with its top edge between the thumb and forefinger of one hand, and grasp any portion of the rear panel of the package contiguous with its top edge between the thumb and forefinger of the other hand to pull the panels apart and to separate the strips. Alternatively, the user can directly grasp one of the strips between his/her thumb and forefinger of one hand and the other strip between the thumb and forefinger of the other hand to pull the strips apart. In either case this action unsnaps the closure, i.e., causes the tongue of strip 24A to snap out of the groove of strip 24B, thereby freeing the panels and providing access to the interior of the package through its mouth.

As should be appreciated by those skilled in the art the tongue portion 44 of the male closure strip 24A, i.e., the portion including the transversely extending slits 62, is completely covered by the panel 26 when the strip 24A is secured to that panel. Thus, the only visible portions of the male closure member are the two coplanar flanges 40 and 42. Accordingly the presence of the male closure element does not detract from the aesthetics of the package.

In the event that it is desired to hide the closure 24 from view, a pair of overlay or cover strips can be used to hide the respective strips or elements of the closure. In particular, two optional elongated strip 80 and 82 may be provided. These optional overlay strips are shown by the phantom lines in FIG. 1 and by the solid lines in FIG. 2. As can be seen the overlay strip 80 is used to obscure either closure strip 24A, while the other overlay strip 82 is used to obscure the closure strip 24B. It should be clear that the overlay strip 82 can be used to obscure the closure strip 24A, while the overlay strip 80 is used to obscure the closure strip 24B. To achieve that end, both of the strips are of the same construction. In particular, each of the strips is formed of a flexible sheet material and each is of a sufficient width and height to cover the entire length of its associated closure strip. Each overlay strip is adhesively secured by an adhesive layer 84 to the portions of the panel contiguous with the associated closure strip. If desired the overlay strips can be formed of the same material as that making up the panels of the package, and may also be of the same color, surface texture, and bear the same indicia (if any) as the material of the panels. By so doing, the package's panels will appear uninterrupted visually, i.e., the package will appear as if it didn't include any closure members. The adhesive 84 can be a hot melt adhesive or any other suitable type of adhesive. The overlay strips can be secured so that they closely conform to the closure strips over which they are placed or can be secured so that they merely bridge those strips. For example, with respect to the male closure strip 24A, the overlay strip 80 may be in intimate engagement with the flanges 40 and 42 and wall portions 58 and 60 of the strip 24A so that a portion of the overlay strip extends to the channel 56 as shown by the phantom lines in FIGS. 3 and 4. Alternatively, the overlay strip 80 may merely be secured to the portions of the bag panel 26 contiguous with the strip 24A and engaging the flanges 40 and 42, but not engaging the wall portions 58 and 60 forming the entryway to the channel 56. In so doing the overlay strip will remain generally planar, with a generally planar portion bridging over the tapered entryway to the channel 56. This latter arrangement not only obscures the male closure strip 24A from being seen, but also has the effect of obscuring its very existence, since the shape of the underlying closure strip 24 will not be visible. With respect to the female closure strip 24B, the overlay strip 82 may be in intimate engagement with the entire outer surface of the C-shaped portion 70 and with the entire outer surface of the flange 68 as shown by the phantom lines in FIGS. 3 and 4. Alternatively, the overlay 80 strip may merely be secured to the portions of the bag panel 28 contiguous with the strip 24B and engaging only a portion of the C-shaped portion 70 so that the overlay strip 82 appears to be bowed gently, simulating a generally planar appearance, thereby obscuring not only the closure strip 24B, but the shape of the closure strip.

As should be appreciated by those skilled in the art the use of overlay strip provides advantages in addition to concealment of the closure strips and aesthetics of the finished bag. In particular, the overlay strips help to secure the closure strips to the bag. They also serve to protect the bag's panels from puncture or other damage in the event that the corners or edges of the closure may be sharp. In addition, the cover strip would also serve to protect the user in such an event. As should be appreciated by those skilled in the art to achieve these advantages the overlay strips need not be opaque. Thus, it is contemplated that the overlay strips be formed of transparent or translucent materials, if obscuring the closure strip is not a concern.

The male closure strip 24A and the female closure strip 24B are preferably both formed of the same material, e.g., extruded plastic, and are preferably provided in indeterminate lengths, e.g., reels or linear sections, to apparatus for applying the strips to a filled and sealed bag 22. To that end, as will be described in detail in the portion of this specification to follow, the indeterminate length of material making up the male closure strip 24A and the indeterminate length of material making up the female closure strips 24B are each severed into the appropriate length for use on the package, with the length of the severed pieces depending upon the width of the mouth of the package. Moreover, in accordance with one preferred aspect of this invention the strips 24A and 24B are applied to a series of filled and sealed packages 22 by automated equipment. One exemplary embodiment of such automated equipment is the applicator apparatus designated by the reference number 100 and shown in FIGS. 7–9. The apparatus 100 is arranged to make use of a supply of extruded plastic for the male closure strip 24A and a supply of extruded plastic for the female closure strip 24B. The apparatus 100 includes a pair of feeder devices 102 and 104 (to be described later) for carrying the indeterminate length strips to respective cutters 106 and 108 (also to be described later) to sever the indeterminate length strips into respective closure strips 24A and 24B. The apparatus also includes respective adhesive applicator devices 110 and 112 to apply an adhesive on the desired portions of the respective closure strips 24A and 24B. The apparatus also comprises a pair of respective carrier heads 114 and 116, including respective track sections 118 and 120, for receiving the closure strips 24A and 24B, respectively, which now have adhesive thereon, and for carrying those strips into engagement with the panels 26 and 28, respectively, of a filled and sealed bag 22. The coordination of all of the operations of the apparatus is effected by any suitable controller (not shown), such as a microprocessor. That controller provides electrical signals to various motors, actuators, etc., making up the device so that a series of bags 22 that have been filled and sealed may be carried by a conveyor (not shown) to the apparatus 100, whereupon snap-closures 24 constructed in accordance with this invention can be applied to each of those bags.

Figure 7:
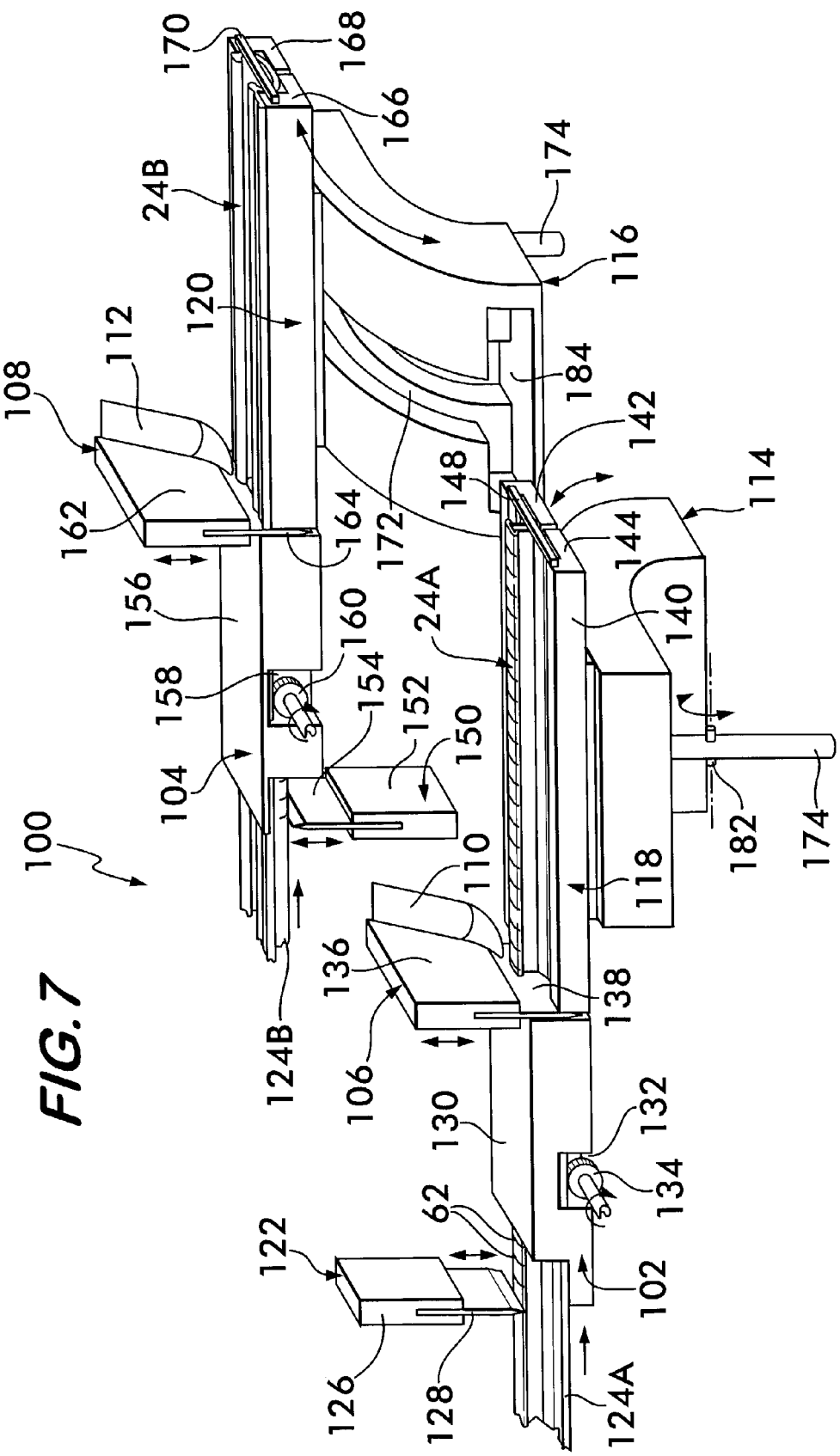
FIG. 7 is an isometric view of a portion of an exemplary machine for fabricating the closure components and for applying and securing them to the respective panels of a gusseted flexible package.

As will be appreciated from the discussion to follow each closure strip 24A and 24B includes at least one portion that facilitates the automated movement of it through the apparatus 100 for securement to the bag 22. Those portions constitute the flange 40 and the channel 56 of the male closure strip 24A and the flange 68 of the female closure strip 24B. Before describing those portions and their interaction with components of the apparatus 100, a discussion of the components making up the apparatus 100 is in order. To that end, as best seen in FIG. 7 an indeterminate length 124A of material for forming the closure strip 24A is provided from a supply (not shown). The source can comprise a reel of material that is extruded to the shape of the male closure element or can be plural strips of such extrusions. The extrusions may be pre-slit with the equidistantly spaced transverse slits 62 or may be unslit for slitting by the apparatus 100. An advantage of pre-slitting the source material is that it can be readily reeled up into a supply reel for ready use with the apparatus. In the exemplary embodiment shown the extrusions of source material for forming both the male and female closure strips are not pre-slit (i.e., are unslit) and are arranged to be slit by the apparatus 100 and in particular a pair of slicing heads 122 and 150 to be described later. If the source material is pre-slit, the apparatus 100 need not make use of slicing heads 122 and 150 to form the transverse slits 62 in the male and female extrusions, since such slits will already be present.

In the exemplary embodiment shown, the source material for the male closure strip is of the identical cross-sectional shape of the strip 24A, but does not include the transverse slits 62 cut therein. The source material 124A may be provided from a reel or a reservoir of long sections to the feeder device 102. The feeder device 102 basically comprises a block (to be described later) through which a channel (not shown) passes. The source material is arranged to be introduced into this channel and then fed to downstream components for severing to form the male closure strip 24A and subsequent application to the panel 26 of the bag.

Located immediately adjacent the upstream end of the feeder device 102 is a slicing head 122. The head basically comprises a block 126 holding a linear blade 128. The head is arranged to be reciprocated towards and away from the source material 124A by means (not shown). This action has the effect of forming a transverse cut or slit in the source material. That slit forms one of the heretofore described transverse slits 62. The operation of the slicing head is coordinated with the feeder device 102, to form plural equidistantly spaced transverse slits 62 in the source material. It should be pointed out at this juncture, that other types of slicing heads, e.g., a rotary blade, may be used to form the slits 62.

The movement of the source material through the apparatus so that it can have the slits 62 cut therein and so that the resulting material can be severed to form the male closure strip 24A is accomplished by the heretofore identified feeder device 102. To that end, the leading end of the source material 124A for forming the strip 24A, and which has just been severed by the blade 128, is introduced into a feeder device 102. The feeder device 102 basically comprises a block 130 through which a channel (not shown) passes. The channel has a cross-sectional shape to accommodate the source material 124A. The block 130 also includes a notch 132 that is in communication with the channel passing through the block and is located so that a portion of the underside of the source material 124A is exposed. A drive roller 134 is located at the notch 132 to frictionally engage the underside of the source material 124A, e.g., the underside of its flange 40. The drive roller 134 is driven by means (not shown) to cause it to rotate in the clockwise direction as shown in FIG. 7. The rotation of the drive roller 134 thus carries the supply material 124A through the feeder device 102. If desired the drive roller may be located so that it engages a different portion of the supply material, e.g., it may be located and arranged to engage the nub 66 on one of the flanges.

Disposed immediately adjacent the downstream end of the feeder device block 130 is the heretofore identified cutter 106. The cutter 106 basically comprises a block 136 holding a linear blade 138. The cutter 106 is arranged to be reciprocated towards and away from the source material 124A by means (not shown). This action has the effect of severing an upstream portion of the supply 124A from the remainder of the supply to form the strip 24A. The length of the supply material that is fed upstream of the cutter 106 is determined by the width of the mouth of the package 22 onto which the male closure strip 24A is to be applied. That length of supply material is introduced into the heretofore identified track 118 of the carrier head 114. To that end the carrier head is located immediately upstream of the cutter 106. The details of the track 118 and the carrier head 114 will be described later. Suffice it for now to state that the feeder device 102 feeds a desired length of the supply material 124A into the track 118 and is coordinated with the cutter 106 so that when that track is filled (as shown in FIG. 7) the closure strip 24A will be of the desired length and can be severed from the remaining supply material 124A.

Located immediately upstream of the cutter head 106 and above the downstream end of the track 118 is the heretofore identified adhesive applicator 110. The adhesive applicator can be any type of device, e.g., a pair of glue guns, for applying a hot melt adhesive 64 onto the flanges 40 and 42 of the now cut male closure strip 24A. It should be noted that other types of adhesives can be used. If so, any type of adhesive applicator suitable for use with such alternative adhesives can be used and located immediately upstream of the cutter 106 in lieu of the applicator 110. In fact, it is contemplated that the apparatus 100 can be used with supply material 124A having an adhesive pre-applied to its flanges. For example, it is contemplated that the flanges 40 and 42 of the supply material 124A include an adhesive that has been extruded thereon so that no adhesive applicator is required of the apparatus 100. In such alternative embodiments, the adhesive can be applied as a co-extrusion when the supply material 124A is made, or can be extruded onto its flanges after the extrusion of the material 124A. As will be appreciated by those skilled in the art the use of an extruded adhesive on the flanges of the supply material 124A has the advantage of eliminating or at least minimizing the chances that the adhesive will spill off of the strip's flanges onto the contiguous portion of the bag panel 26 to which it is secured, thereby resulting in a more consistently aesthetically pleasing appearance for the bag 22. Moreover, if an extruded adhesive is used the nubs 66 on the flanges 40 and 42 (provided to prevent the hot melt adhesive from spilling off the flanges) may be eliminated.

The track 118 with the adhesive bearing male closure strip 24A located therein basically comprises a pair of elongated flanged jaws 140 and 142 which are disposed adjacent one another on the carrier head 114. The jaws are movable with respect to each other (by means, not shown) and form a channel therebetween having a cross-sectional shape to accommodate the male closure strip 24A therein. The jaws forming the track 118 are arranged to be opened slightly to enable the strip 24A of material to be slid down the channel between them by the operation of the feeder device 102. Once the strip 24A is in place in the track, the jaws are brought closer together so that the male closure strip 24A is held therein. A slot or entry-way 144 to the strip-holding channel is provided between the jaws 140 and 142. A spline 146 (FIG. 8) forming a portion of the carrier head 114 extends through the slot 144 so that it can extend into the channel 56 of the supply material 124A as that material is fed down the track 118 to be severed to form the male closure strip 24A. The disposition of the spline in the channel 56 facilitates the movement of the supply material 124A down the track and prevents any deformation thereof. To that end the spline is a thin member mounted on the carrier head 114 and having a thickness that is slightly less than the width of the channel 56 in the supply material 124A. A stop 148 is located at the upstream end of the jaws 140 and 142 to ensure that the length of supply material introduced into the track 118 is precisely the desired length of the male closure strip 24A, i.e., it bridges the upstream end of the channel to prevent the upstream end of the supply material 124A from exiting the track 118.

Once the male closure strip has been severed from the supply material 124A and has the adhesive 64 applied thereto it is ready to be carried into engagement with the panel 26 of the bag 22. This action will occur at the same time that the female closure strip 24B is carried into engagement with the panel 28 of the bag. However, before describing these operations, a description of the formation of the female closure strip 24B is in order.

The female closure strip 24B is formed at the same time as the male closure strip by similar portions of the apparatus 100 as that described heretofore with respect to the male closure strip. To that end as best seen in FIG. 7 an indeterminate length 124B of material for forming the closure strip 24B is provided from a supply (not shown). That source material is of the identical cross-sectional shape of the strip 24B, and in this exemplary embodiment does not include the transverse slits 62 cut therein. The source material 124B may be provided from a reel or a reservoir of long sections to the feeder device 104. The feeder device 104 is similar to the feeder device 102 and includes a channel into which the source material 124B is arranged to be introduced and then fed to downstream components for severing to form the female closure strip 24B and subsequent application to the panel 28 of the bag.

Located immediately adjacent the upstream end of the feeder device 104 and below the incoming supply material 124B is a slicing head 150. The slicing head 150 is constructed similar to slicing head 122 and includes a block 152 holding a linear blade 154. The slicing head 150 is arranged to be reciprocated towards and away from the source material 124B by means (not shown) to form a transverse cut or slit in that source material. That slit forms one of the heretofore described transverse slits 62. The operation of the slicing head 106 is also coordinated with the feeder device 104, to form plural equidistantly spaced transverse slits 62 in the source material 124B. As discussed above, other types of slicing heads, e.g., a rotary blade, may be used to form the slits 62.

The movement of the source material 124B through the apparatus for slitting and cutting to form the female closure strip 24B is accomplished by the heretofore identified feeder device 104. In particular, the leading end of the source material 124B for forming the strip 24B, and which has just been sliced by the blade 154, is introduced into a feeder device 104. The feeder device 104 is similar to feeder device 102 and basically comprises a block 156 through which a channel (not shown) passes. The channel is of a cross-sectional shape to accommodate the source material 124B. The block 156 also includes a notch 158 that is in communication with the channel passing through the block and is located so that a portion of the underside of the incoming source material 124B is exposed. A drive roller 160 is located at the notch 158 to frictionally engage the underside (inside surface) of the flange 68 of the source material 124B. The roller 160 is driven by means (not shown) to cause it to rotate in the clockwise direction, whereupon the roller carries the material 124B through the feeder device 104. If desired, the drive roller may be located so that it engages a different portion of the supply material, e.g., it may be located and arranged to engage the nub 66 on the flange 68. Disposed immediately adjacent the upstream end of the feeder device block 156 is the heretofore identified cutter 108. The cutter 108 is similar to cutter 106 and basically comprises a block 162 holding a linear blade 164. The cutter 108 is arranged to be reciprocated towards and away from the supply material 124B by means (not shown) to sever the upstream portion of the supply material 124B from the remainder of it to form the female closure strip 24B. The length of the supply material 124B that is fed upstream of the cutter 108 is determined by the width of the mouth of the package 22 and is introduced into the heretofore identified track 120 of the carrier head 116. The track 120 is similar to the track 118 described above. The feeder device 104 feeds a desired length of the supply material 124B into the track 120 and is coordinated with the cutter 108 so that when that track is filled (as shown in FIG. 7) the female closure strip 24B will be of the desired length and can be severed from the remaining supply material 124B.

Located immediately upstream of the cutter head 108 is the heretofore identified adhesive applicator 110. That device is similar to applicator 110 (except that there is only one) to apply a hot melt adhesive 64 onto the inner surface of the C-shaped portion 70 and the associated flange 68 of the now cut female closure strip 24B. Other types of adhesives can be used for the female closure strip, if desired. If so, any type of adhesive applicator suitable for use with such alternative adhesives can be used and located immediately upstream of the cutter 108. In fact, as discussed with reference to the male closure strip 24A, it is contemplated that the apparatus 100 can be used with supply material 124B having an adhesive pre-applied to its interior surface. For example, it is contemplated that the interior surface of the C-shaped portion of the supply material 124B and the flange portion 68 of that supply material include an adhesive that has been extruded thereon so that no adhesive applicator is required of the apparatus 100. In such alternative embodiments, the adhesive can be applied as a co-extrusion when the supply material 124B is made, or can be extruded onto the supply material after it has been extruded into shape. The extrusion of the adhesive onto the supply material 124B offers the same advantages as discussed above with respect to extruding an adhesive on the supply material 124A.

The track 120 basically comprises a pair of elongated jaws 166 and 168 which are disposed adjacent one another on the carrier head 116. The jaws form a channel therebetween having a cross-sectional shape to accommodate the female closure strip 24B therein as shown in FIG. 7. The jaws are arranged to be opened slightly to enable the supply material 124B to be slid therealong to form the female closure strip 24B. A stop 170 is located at the upstream end of the jaws 166 and 168 to make sure that the length of supply material 124B introduced into the track 120 is precisely the desired length of the female closure strip 24B. The jaws are arranged to be closed to hold the female closure strip therein so that it can be applied to the bag. As mentioned above, this action occurs at the same time that the male closure strip 24A is carried into engagement with the panel 26 of the bag.

In the exemplary embodiment of apparatus 100 shown herein the two tracks 118 and 120 into which the male and female closure strips 24A and 24B, respectively, are introduced are disposed horizontally. The bag 22 to which those closure strips has already been filled and its mouth sealed by filling and sealing apparatus (not shown). Such filling and sealing apparatus may be any conventional machine. The filled and sealed bags exiting from the filling and sealing machinery are typically disposed on a conveyor and are oriented so that their front and rear panels 26 and 28 are disposed vertically. Accordingly, the carrier heads 114 and 116 of the applicator apparatus 100 are arranged to pivot the tracks 118 and 120 holding the closure strips from the horizontal orientation shown in FIG. 7 to a vertical orientation shown in FIG. 8, whereupon the male closure strip 24A is disposed in a confronting relationship to the bag panel 26 adjacent the location of the bag's mouth, while the female closure strip is disposed in a confronting relationship to the bag panel 28 adjacent the location of the bag's mouth.

The two carrier heads are of similar construction. In particular, the carrier head 114 basically comprises an arcuate guide track 172 (FIG. 8) through which a pivotable piston actuator 174 extends. The track 172 is in the form of a 90 sector of a circular arc. The upper end of the track is oriented in a horizontal plane and the lower end of the track is oriented in a vertical plane. The piston actuator 174 is an elongated member from which a an elongated piston shaft 176 is arranged to be pneumatically extended under the control of the apparatus controller. The top end of the piston shaft 176 is fixedly secured to a guide block 178. The guide block 178 is arranged to slide along the arcuate track 172. A plate 180 is fixedly secured to the guide block and supports the two jaws 140 and 142 forming the track 118 thereon. A pivot pin 182 extends through a middle portion of the piston actuator. The piston actuator is arranged to be pivoted by means (not shown) about the pin 182 from a vertical orientation shown by full lines in FIG. 7 to a horizontal orientation shown by phantom lines in that figure. When the piston actuator is in the vertical orientation the track 118 is oriented horizontally and is ready to receive the male closure strip 24A. In order to secure the male closure strip onto the panel 26 of the bag 22 once the closure strip has been formed and had its adhesive applied thereto, the carrier head 114 of the apparatus 100 operates, whereupon the piston actuator 174 is pivoted under control of the apparatus controller to bring the track 118 bearing the male closure strip 24A to the vertical orientation shown by the phantom lines in FIG. 8. At the same time that this occurs the carrier head 116 is operated to bring the track 120 bearing the female closure strip 124B into its vertical orientation to secure it to the bag panel 28. As mentioned above, the carrier head 116 is constructed similarly to the carrier head 114. Thus, in the interest of drawing simplicity and brevity the various components making up the carrier head 116 will be given the same reference numbers as those components making up the carrier head 114 and the details of their construction and operation will not be reiterated.

Figure 8:
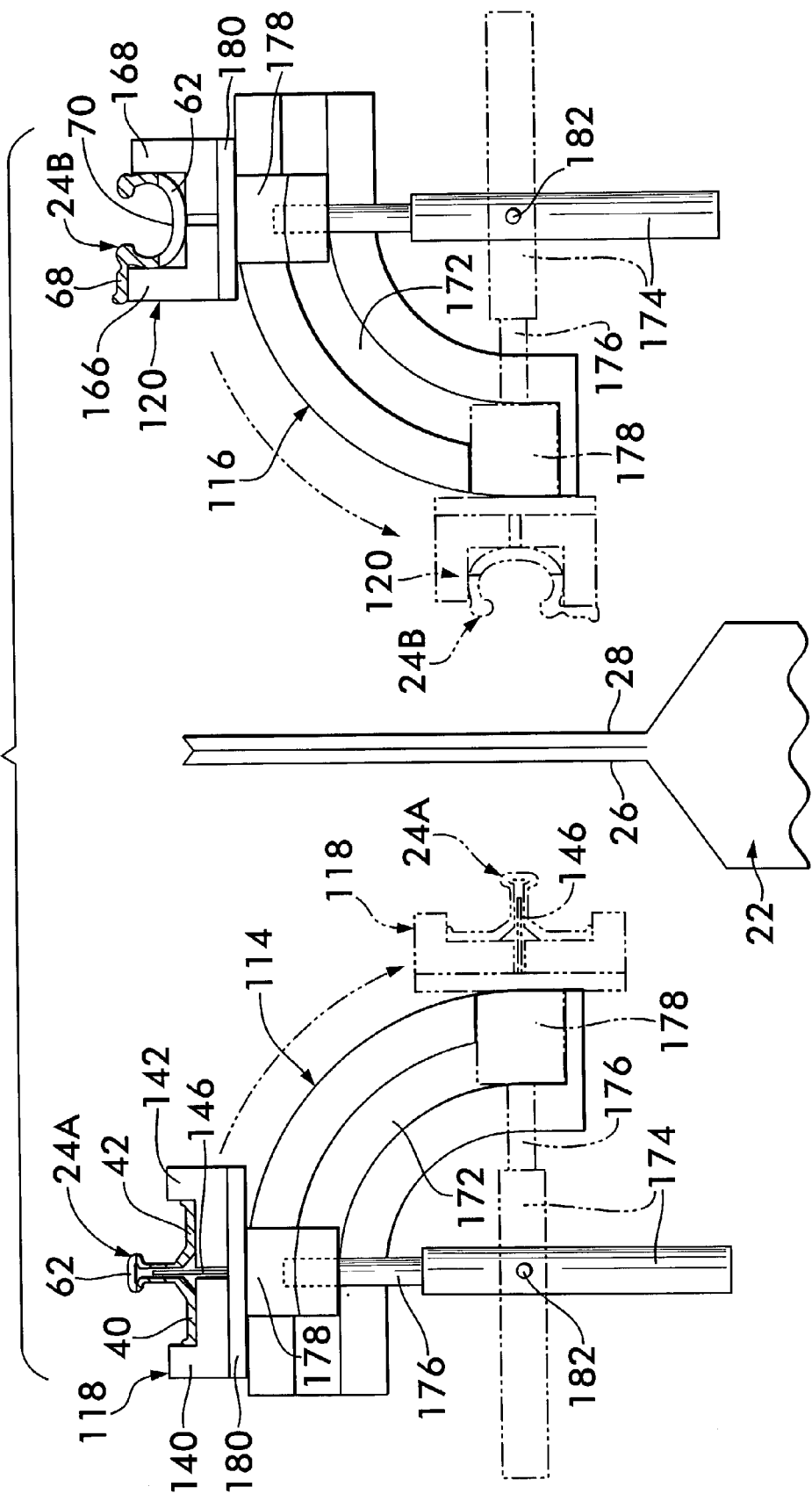
FIG. 8 is an enlarged end view of the exemplary machine of FIG. 7 showing it carrying out the initial step in the process of applying and securing the closure components to the package.

As best seen in FIGS. 7 and 8 the lower end of the track 172 of the each carrier head 114 and 116 includes an elongated transversely extending cavity 184. When the piston actuator 172 carrying the track 118 is pivoted to the horizontal orientation shown in phantom lines in FIG. 8 the guide block 178 is located in that transversely extending cavity. In a similar manner when the piston actuator 172 carrying the track 120 is pivoted to the horizontal orientation, the guide block 178 of the carrier head 114 is located in its transversely extending cavity 184. The applicator apparatus 100 is now ready to bring the male and female closure strips 24A and 24B, respectively, into engagement with the bag's panels 26 and 28, respectively. This action is shown in FIG. 9. To that end the controller of the apparatus causes the piston actuators 174 of the two carrier heads 114 and 116 to extend their associated piston rods 176 from the actuators. This action moves the guide block 178 out of the cavity 184 of the carrier head 114 and brings the male closure member 24A located in the track 118 into tight engagement with the outer surface of the bag panel 26, whereupon the adhesive 64 on the male closure strip secures it in place. At the same time the guide block 178 of the carrier head 116 is moved out of the cavity 184 by the extension of its piston rod 176 to bring the female closure member 24B located in the track 120 into tight engagement with the outer surface of the bag panel 28, whereupon the adhesive 64 on the female closure strip secures it in place. This completes the application of the closure 24 to the bag 22. The piston rods are then automatically retracted to bring the guide blocks 178 into their respective cavities 184 of their respective carrier heads. Once this has occurred the piston actuators are pivoted to their vertical orientation, thereby carrying the tracks 118 and 120 back to their horizontal orientation so that the tracks may be filled with the next succeeding portions of the supply materials 124A and 124B, respectively, to form the next set of closures 24A and 24B and to apply the adhesive to such closure strips. Once this has occurred the apparatus automatically operates to apply those closure strips to the bag.

If it is desired to utilize optional overlay strips, such as those described above, the applicator apparatus 100 can be modified to include carriers for carrying the overlay strips into engagement with the package over the closure strips 24A and 24B.

It should be pointed out at this juncture that the apparatus 100 is merely exemplary of various types of apparatus that can be used to apply closure components constructed in accordance with this invention to flexible bags. Thus, the apparatus can be arranged to sever the strips from supply material before applying the hot melt or other adhesive. Moreover, the supply material and/or the formed strips could be fed through applicator guide tracks in a vertical orientation to avoid the need to pivot them into a horizontal plane for application to the panels of the bag. In such an arrangement the adhesive can be applied to the supply material or the formed strips while in the vertical orientation. Further still, the formed closure strips can be held in the carrier or other applicator heads by means other than retractable gripping jaws. As will also be appreciated by those skilled in the art, the closures of this invention can be modified insofar as its construction and/or material composition is concerned in order to accommodate the preferred degree of opening and/or closing pressure required to operate it. Moreover, a closure in accordance with this invention need not extend across the full width of the bag or package to which it is secured. Thus, a closure may only extend across a portion of the width of the package or bag, e.g., if the mouth of the bag only extends a portion of the width of the bag, the closure need only extend the portion of the bag encompassed by the mouth. Further still, the adhesive for securing each closure strip to its associate panel of the bag may be located on other surface(s) of the strip than shown and described above. Further yet, the closure strips may include an adhesive extruded on their outer surface to secure overlay strip thereon, if such overlay strips are desired.

While the invention has been described in detail and with reference to specific examples thereof, it will be apparent to one skilled in the art that various changes and modifications can be made therein without departing from the spirit and scope thereof.

What is claimed is:

1. A snap-closure for securement to a flexible package having an interior for holding material therein, the package being formed of a flexible material and comprising first and second panels connected to each other, each of the panels having an upper end portion, an inner surface and outer surface which conjoin to form a mouth for the package there-between, the mouth being openable to provide access to the interior of the package, said snap closure being arranged for reclosing and sealing said mouth and comprising a male closure element and female closure element, said male closure element being an elongated member comprising a pair of coplanar flanges, a pair of walls projecting upward from said flanges to define a channel there-between and a bulbous tongue portion interconnecting said pair of walls, said tongue portion having a plurality of slits extending transversely therethrough at longitudinally spaced locations along said male closure element to enable said male closure element to bend along its length, each of said slits terminating remote from said coplanar flanges, said male closure element having an outer surface and an inner surface, said inner surface of said male closure element being arranged to be secured to the outer surface of one of the panels adjacent the mouth of the package and with portions of the panel extending about said tongue portion, said female closure element being an elongated member comprising a generally C-shaped portion having an elongated edge and a flange projecting along said edge, said C-shaped portion having a plurality of transverse slits extending partially therethrough at longitudinally spaced locations along said female element, said C-shaped portion having an outer surface and an inner surface, said inner surface of female closure element being arranged to be secured to the outer surface of the other of the panels adjacent the mouth of the package, said tongue portion of said male closure element being arranged to snap-fit into said C-shaped portion of said female closure element, with portions of said panels tightly interposed therebetween to close said mouth of the package to prevent the ingress of air into the package through the mouth of the package.

2. The snap-closure of claim 1 wherein said tongue portion of said male closure element comprises a void extending the length of said male closure element and in communication with said channel, said void being substantially wider than said channel, said transverse slits extending through said void.

3. The snap-closure of claim 1 wherein said tongue portion of said male closure element comprises a void extending the length of said male closure element and in communication with said channel, said void being substantially wider than said channel, said transverse slits extending through said void and partially into said channel.

4. The snap-closure of claim 1 wherein said coplanar flanges of said male closure element each include a free end in the form of a nub projecting generally perpendicularly from said inner surface of said male closure element.

5. The snap-closure of claim 4 wherein said flange of said female closure element includes a free end in the form of a nub projecting from said inner surface of said female closure element.

6. The snap-closure of claim 4 additionally comprising an adhesive extruded onto at least one of said coplanar flanges of said male closure element.

7. The snap-closure of claim 6 additionally comprising an adhesive extruded onto at said flange of said female closure element.

8. The snap-closure of claim 4 additionally comprising an adhesive extruded onto said flange of said female closure element.

9. The snap-closure of claim 1 wherein said flange of said female closure element includes a free end in the form of a nub projecting from said inner surface of said female closure element.

10. A snap-closure for securement to a flexible package having an interior for holding material therein, the package being formed of a flexible material and comprising first and second panels connected to each other, each of the panels having an upper end portion, an inner surface and outer surface which conjoin to form a mouth for the package there between, the mouth being openable to provide access to the interior of the package, said snap closure being arranged for reclosing and sealing said mouth and comprising a male closure element and female closure element, said male closure element being an elongated member comprising a pair of coplanar flanges, a pair of walls projecting upward from said flanges to define a channel there between and a bulbous tongue portion interconnecting said pair of walls, said tongue portion having a plurality of slits extending transversely therethrough at longitudinally spaced locations along said male closure element, each of said slits terminating remote from said coplanar flanges and being confined to said tongue portion or extending a short distance into said walls, to enable said male closure element to bend along its length, said male closure element having an outer surface and an inner surface, said inner surface of said male closure element being arranged to be secured to the outer surface of one of the panels adjacent the mouth of the package and with portions of the panel extending about said tongue portion, said female closure element being an elongated member comprising a generally C-shaped portion having an elongated edge and a flange projecting along said edge, said C-shaped portion having a plurality of transverse slits extending partially therethrough at longitudinally spaced locations along said female element, said C-shaped portion having an outer surface and an inner surface, said inner surface of female closure element being arranged to be secured to the outer surface of the other of the panels adjacent the mouth of the package, said tongue portion of said male closure element being arranged to snap-fit into said C-shaped portion of said female closure element, with portions of said panels tightly interposed there between to close said mouth of the package to prevent the ingress of air into the package through the mouth of the package.

11. A snap-closure and pair of overlay strips for securement to a flexible package having an interior for holding material therein, the package being formed of a flexible material and comprising first and second panels connected to each other, each of the panels having an upper end portion, an inner surface and outer surface which conjoin to form a mouth for the package there-between, the mouth being openable to provide access to the interior of the package, said snap closure being arranged for reclosing and sealing said mouth and comprising a male closure element and female closure element, said male closure element being an elongated member comprising a pair of coplanar flanges, at least one walls projecting upward from said flanges and a bulbous tongue portion connected to said at least one wall, said tongue portion having a plurality of slits extending transversely therethrough at longitudinally spaced locations along said male closure element to enable said male closure element to bend along its length, each of said slits terminating remote from said coplanar flanges, said male closure element having an outer surface and an inner surface, said inner surface of said male closure element being arranged to be secured to the outer surface of one of the panels adjacent the mouth of the package and with portions of the panel extending about said tongue portion, said female closure element being an elongated member comprising a generally C-shaped portion having an elongated edge and a flange projecting along said edge, said C-shaped portion having a plurality of transverse slits extending partially therethrough at longitudinally spaced locations along said female element, said C-shaped portion having an outer surface and an inner surface, said inner surface of female closure element being arranged to be secured to the outer surface of the other of the panels adjacent the mouth of the package, said tongue portion of said male closure element being arranged to snap-fit into said C-shaped portion of said female closure element, with portions of said panels tightly interposed there-between to close said mouth of the package to prevent the ingress of air into the package through the mouth of the package, one of said overlay strips being arranged to be secured over said male closure element to obscure said male closure element, the other of said overlay strips being arranged to be secured over said female closure element to obscure said female closure element.

12. The snap-closure of claim 11 wherein each of said slits extends a short distance into said at least one wall.

13. The snap-closure of claim 11 wherein each of said overlay strips is formed of a similar material as the material forming the panels of the package.

14. The snap-closure of claim 11 wherein each of said overlay strips provides a similar visual appearance to the visual appearance provided by the panel of said package to which it is secured.

15. The snap-closure of claim 14 wherein each of said overlay strips provides a similar visual appearance to the visual appearance provided by the panel of said package to which it is secured.

16. The snap-closure of claim 11 additionally comprising an adhesive extruded onto at least one of said coplanar flanges of said male closure element.

17. The snap-closure of claim 11 additionally comprising an adhesive extruded onto at said flange of said female closure element.

18. The snap-closure of claim 17 additionally comprising an adhesive extruded onto at said flange of said female closure element.

19. A snap-closure and pair of overlay strips for securement to a flexible package having an interior for holding material therein, the package being formed of a flexible material and comprising first and second panels connected to each other, each of the panels having an upper end portion, an inner surface and outer surface which conjoin to form a mouth for the package there between, the mouth being openable to provide access to the interior of the package, said snap closure being arranged for reclosing and sealing said mouth and comprising a male closure element and female closure element, said male closure element being an elongated member comprising a pair of coplanar flanges, at least one walls projecting upward from said flanges and a bulbous tongue portion connected to said at least one wall, said tongue portion having a plurality of slits extending transversely therethrough at longitudinally spaced locations along said male closure element, each of said slits terminating remote from said coplanar flanges and being confined to said tongue portion or extending a short distance into said walls, said slits enabling said male closure element to bend along its length, each of said slits terminating remote from said coplanar flanges and being confined to said tongue portion, said male closure element having an outer surface and an inner surface, said inner surface of said male closure element being arranged to be secured to the outer surface of one of the panels adjacent the mouth of the package and with portions of the panel extending about said tongue portion, said female closure element being an elongated member comprising a generally C-shaped portion having an elongated edge and a flange projecting along said edge, said C-shaped portion having a plurality of transverse slits extending partially therethrough at longitudinally spaced locations along said female element, said C-shaped portion having an outer surface and an inner surface, said inner surface of female closure element being arranged to be secured to the outer surface of the other of the panels adjacent the mouth of the package, said tongue portion of said male closure element being arranged to snap-fit into said C-shaped portion of said female closure element, with portions of said panels tightly interposed there between to close said mouth of the package to prevent the ingress of air into the package through the month of the package, one of said overlay strips being arranged to be secured over said male closure element to obscure said male closure element, the other of said overlay strips being arranged to be secured over said female closure element to obscure said female closure element.

20. A flexible package having an interior for holding material therein, said package being formed of a flexible material and comprising an integral snap-closure, first and second panels, and a pair of overlay strips, said panels being connected to each other and each having an upper end portion, an inner surface and outer surface which conjoin to form a mouth for the package there between, said mouth being openable to provide access to the interior of the package, said snap closure being arranged for reclosing and sealing said mouth and comprising a male closure element and female closure element, said male closure element being secured to said outer surface of one of said panels, said female closure element being secured to said outer surface of the other of said panels, one of said overlay strips being disposed over said outer surface of said male closure element and secured to the panel to which said male closure element is secured to obscure said male closure element from view, the other of said overlay strips being disposed over said outer surface of said female closure element and secured to the panel to which said female closure element is secured to obscure said female closure element from view.

21. The package of claim 20 wherein each of said overlay strips is formed of a similar material as the material forming the panels of the package.

22. The package of claim 20 wherein each of said overlay strips provides a similar visual appearance to the visual appearance provided by the panel of said package to which it is secured.

23. The package of claim 20 additionally comprising an adhesive on said outer surface of said male closure element to secure said overlay strip to said male closure element, and an adhesive on said outer surface of said female closure element to secure said overlay strip to said female closure element.

24. The package of claim 20 wherein said male closure element includes a pair of coplanar flanges, one of said overlay strips being adhesively secured to said coplanar flanges or said male closure element.

25. The package of claim 20 additionally comprising an adhesive extruded onto at least one of said coplanar flanges of said male closure element.

26. The package of claim 25 additionally comprising an adhesive extruded onto at said flange of said female closure element.

27. The package of claim 20 additionally comprising an adhesive extruded onto at said flange of said female closure element.

28. A flexible package having an interior for holding material therein, said package being formed of a flexible material and comprising an integral snap-closure, and first and second panels connected to each other, each of said panels having an upper end portion, an inner surface and outer surface which conjoin to form a mouth for the package there between, said mouth being openable to provide access to the interior of the package, said snap closure being arranged for re-closing and sealing said mouth and comprising a male closure element and female closure element, said male closure element being an elongated member comprising a pair of coplanar flanges, a pair of walls projecting generally perpendicularly from said flanges to define a channel there between and a bulbous tongue portion interconnecting said pair of walls, said bulbous tongue portion having a plurality of slits extending transversely therethrough at longitudinally spaced locations along said male closure element to enable said male closure clement to bend more easily along its length, each of said slits terminating remote from said coplanar flanges, said male closure element having an outer surface and an inner surface, said inner surface of said male closure element being secured to said outer surface of one of said panels adjacent said mouth and with portions of said panel extending about said tongue portion, said female closure element being an elongated member comprising a generally C-shaped portion having an elongated edge and a flange projecting along said edge, said C-shaped portion having a plurality of transverse slits extending partially therethrough at longitudinally spaced locations along said female element, said C-shaped portion having an outer surface and an inner surface, said inner surface of female closure element being secured to said outer surface of the other of said panels adjacent said mouth, said tongue portion of said male closure element being arranged to snap-fit into said C-shaped portion of said female closure element, with portions of said panels tightly interposed there between to close said mouth of the package to prevent the ingress of air into the package through said mouth.

29. The package of claim 28 wherein said tongue portion of said male closure element comprises a void extending the length of said male closure element and in communication with said channel, said void being substantially wider than said channel, said transverse slits extending through said void.

30. The package of claim 28 wherein said tongue portion of said male closure element comprises a void extending the length of said male closure element and in communication with said channel, said void being substantially wider than said channel, said transverse slits extending through said void and partially into said channel.

31. The package of claim 28 wherein said coplanar flanges of said male closure element each include a free end in the form of a nub projecting generally perpendicularly from said inner surface of said male closure element.

32. The package of claim 31 wherein said flange of said female closure element includes a free end in the form of a nub projecting from said inner surface of said female closure element.

33. The package of claim 28 wherein said flange of said female closure element includes a free end in the form of a nub projecting from said inner surface of said female closure element.

34. The package of claim 28 additionally comprising at least one overlay strip disposed over said outer surface of either said male closure element or said female closure element and secured to the panel to which said male closure element or said female closure element is secured to obscure said male closure element or said female closure element from view.

35. The package of claim 34 comprising two overlay strips one for said male closure element and the other for said female closure element.

36. The package of claim 34 wherein said at least one overlay strip is formed of a similar material as the material forming the panels of the package.

37. The package of claim 34 wherein said at least one overlay strip provides a similar visual appearance to the visual appearance provided by the panel of said package to which it is secured.

38. The package of claim 28 additionally comprising an adhesive extruded on at least one portion of said inner surface of said male closure element.

39. The package of claim 28 additionally comprising an adhesive extruded on at least one portion of said inner surface of said female closure element.

40. The package of claim 28 additionally comprising an adhesive extruded on at least one of said flanges of said male closure element and an adhesive extruded on said flange of said female closure element.

41. A flexible package having an interior for holding material therein, said package being formed of a flexible material and comprising an integral snap-closure, and first and second panels connected to each other, each of said panels having an upper end portion, an inner surface and outer surface which conjoin to form a mouth for the package there between, said mouth being openable to provide access to the interior of the package, said snap closure being arranged for re-closing and sealing said mouth and comprising a male closure element and female closure element, said male closure element being an elongated member comprising a pair of coplanar flanges, a pair of walls projecting generally perpendicularly from said flanges to define a channel there between and a bulbous tongue portion interconnecting said pair of walls, said bulbous tongue portion having a plurality of slits extending transversely therethrough at longitudinally spaced locations along said male closure element each of said slits terminating remote from said coplanar flanges and is being confined to said tongue portion or extending a short distance into said walls, said slits enabling said male closure element to bend more easily along its length, said male closure element having an outer surface and an inner surface, said inner surface of said male closure element being secured to said outer surface of one of said panels adjacent said mouth and with portions of said panel extending about said tongue portion, said female closure element being an elongated member comprising a generally C-shaped portion having an elongated edge and a flange projecting along said edge, said C-shaped portion having a plurality of transverse slits extending partially therethrough at longitudinally spaced locations along said female element, said C-shaped portion having an outer surface and an inner surface, said inner surface of female closure element being secured to said outer surface of the other of said panels adjacent said mouth, said tongue portion of said male closure element being arranged to snap-fit into said C-shaped portion of said female closure element, with portions of said panels tightly interposed there between to close said mouth of the package to prevent the ingress of air into the package through said mouth.

* * * * *